May 14, 1968    R. J. MATSON    3,382,582
MAGNETIC INDICATING SQUARE
Filed Nov. 21, 1966
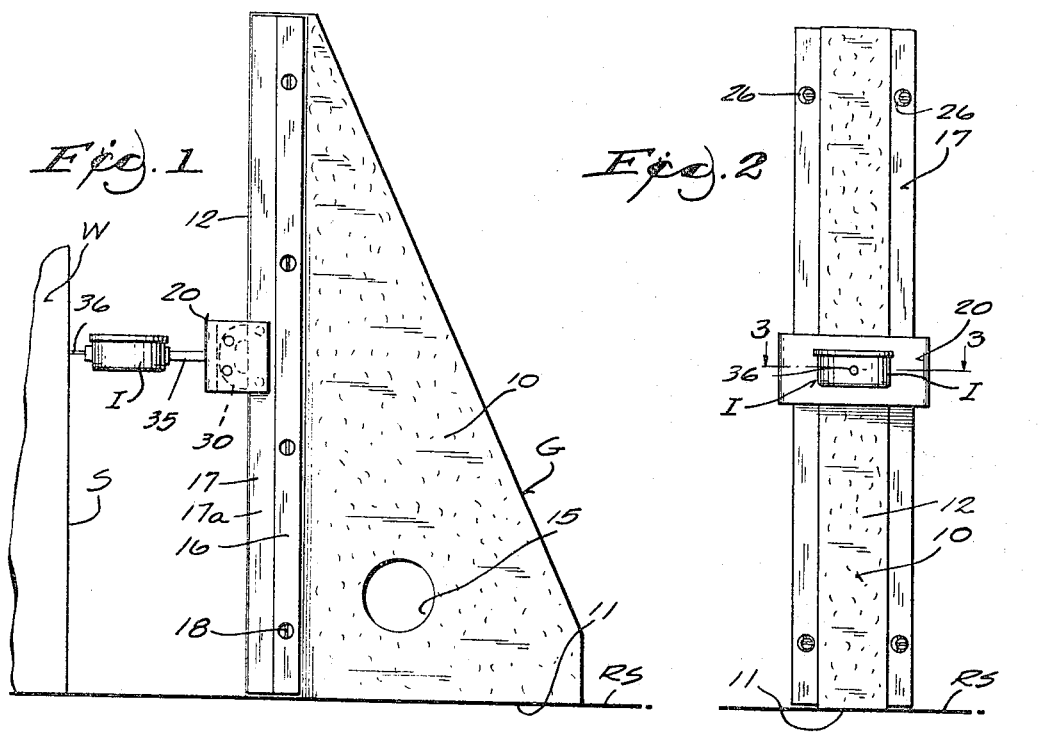
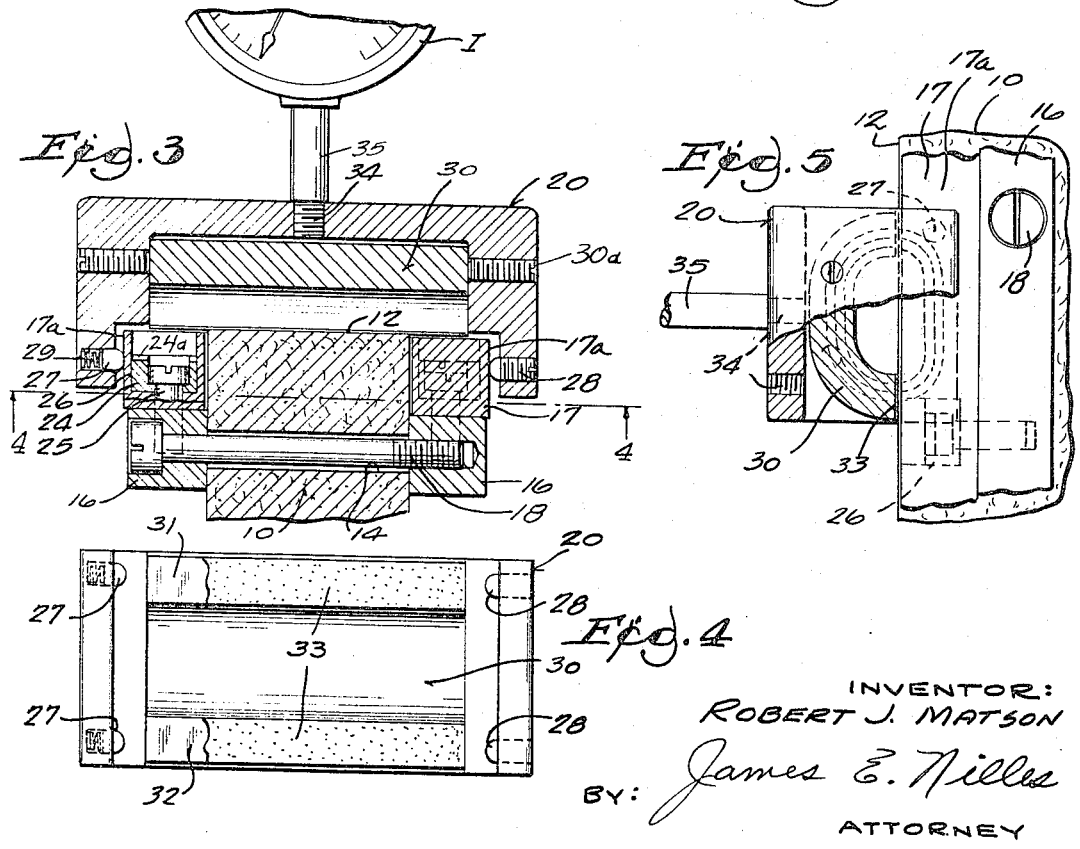
INVENTOR:
ROBERT J. MATSON
BY: James E. Nilles
ATTORNEY

United States Patent Office 3,382,582
Patented May 14, 1968

---

3,382,582
MAGNETIC INDICATING SQUARE
Robert J. Matson, 18920 W. National Ave.,
New Berlin, Wis. 53151
Filed Nov. 21, 1966, Ser. No. 595,990
10 Claims. (Cl. 33—174)

ABSTRACT OF THE DISCLOSURE

A gauge comprising a granite square and having a magnetically attractable guide mounted along a vertical face of the square and an indicator magnetically held against said face for movement therealong and which is used in the metal working industry for checking and measuring the straightness of a workpiece surface and also the squareness of the surface relative to a reference plane.

Background of the invention

The invention pertains generally to geometrical instruments and more particularly to gauges for measuring the accuracy of machined parts as to squareness of a finished surface with reference to a predetermined reference plane and as to straightness of the finished surface.

Prior art gauges of various types have been proposed and used in the past but have had serious deficiencies from one standpoint or another. For example, some of them required "transfer stands" to transfer the distance being measured from the indicator to a master reference, and no direct and immediate reading of the accuracy of the finished surface was possible. Not only did such prior art require time and skill in making and transferring the measurement for reading, but inaccuracies resulted. Furthermore and more importantly, it was difficult if not impossible to obtain consistent and accurate "repeatability" of readings.

Other prior art gauges were not sufficiently stable or accurate due, for example, to the inherent instability of the material, such as steel, of which the gauge itself was made. Steel not only has an appreciable coefficient of expansion but also has a tendency to warp.

Still other gauges were difficult to use properly because of the skill and difficulty required in setting the instruments, both as to the calibrating scales and dials and also as to setting up the entire gauge itself in reference to the workpiece to be measured. Wear of the various, relatively movable parts is also a serious problem in gauges of this general character.

Examples of prior art gauges having at least some of the above shortcomings are the U.S. Patent 3,047,956 issued on Aug. 7, 1962 to G. R. German, and Patent 2,611,968 issued Sept. 30, 1952 to B. D. Brown, Jr.

Other prior art gauges required optical "sightings" or shims and were inaccurate primarily because of human error involved.

Other gauges gave an indication as to squareness of the finished surface but not as to the flatness or straightness thereof.

Summary

The present invention provides a gauge for measuring squareness of a finished surface in respect to a reference surface and also measuring the flatness or straightness of the finished surface. More specifically, the invention utilizes granite as the square, and which granite is precisely finished on two of its surfaces which are normal to one another; such a granite square is exceptionally stable as to coefficient of expansion, as to warping, and as to wear characteristics. The invention furthermore contemplates the use of a magnetically held and very easily but accurately adjusted indicator which works in conjunction with the granite square. The arrangement is such that the square is accurately referenced to the reference plane in all directions, and consequently movement of the indicator toward and away from the reference plane provides an accurate reading of the finished workpiece surface even though the latter itself may not be set exactly normal to the reference surface in a lateral direction in respect to the square, that is to say, the face of the granite square need not be parallel with the face of the workpiece being measured.

The gauge provided by the present invention insures complete and an indefinite number of repeated and direct readings with extreme accuracy. The indicator is firmly and accurately held in respect to its square but can be easily moved without forcing, without requiring any adjustments of levers, knobs or the like, and without wear.

These and other objects and advantages of the present invention will appear hereinafter as this disclosure progresses, reference being had to the accompanying drawings.

Brief description of the drawings

FIGURE 1 is a side elevational view of a gauge embodying the present invention.

FIGURE 2 is a front elevational view of the gauge shown in FIGURE 1.

FIGURE 3 is a fragmentary, plan view, in section, of the gauge, but on an enlarged scale, and taken along line 3—3 in FIGURE 2.

FIGURE 4 is an elevational view of the magnet holder only, taken along line 4—4 in FIGURE 3.

FIGURE 5 is a fragmentary, enlarged detail view of a portion of the gauge as shown in FIGURE 1, certain parts shown in section and broken away for clarity.

Description of the preferred embodiment

The reference surface RS, on which the gauge G is useable, is accurately finished and flat and provides a reference plane. The workpiece W sets on the reference surface and has a surface S which is to be measured, and this surface S is shown as extending upwardly from the reference surface. The surface S is supposed to be properly finished, for example, so that it is formed at a right angle or "square" to the lower side of the workpiece which rests on surface RS.

The present gauge includes a solid piece of granite 10 which is shown as being generally triangular in shape, as viewed from the side. The piece of granite 10 is of considerable width so that it may set firmly on surface RS and at a right angle thereto. The lower surface or side 11 of the granite 10 and the vertical surface or side 12 are very accurately formed and finished, and are arranged at an exact right angle to one another, that is within one second of a degree. Therefore the piece of granite is referred to as a "square." For example, surfaces 11 and 12 are finished by lapping to .0005 of an inch. Bolt holes 14 are formed along the height of the square, adjacent surface 12 and for example may be ¼ of an inch in diameter.

The granite is non-magnetic and has an extremely low coefficient of expansion and varies inconsequentially with normal temperature changes. The granite square is also extremely stable from a standpoint of warpage, showing practically no warpage characteristics.

The square 10 may be of various sizes, including very large sizes of which many prior art gauges are incapable of being made. One or more holes 15 may be formed in the square to reduce its weight and/or provide a means for grasping the square by a crane, or the like, for moving it.

Guide means are secured along either side of the surface 12 of the square for providing, among other things, a guideway or slide for a vertically movable magnet holder 20. This means takes the form of a steel bar 16 permanently fastened to each side of the square and located to the rear (in reference to the front surface 12 of the square) of another bar 17, one of which is adjustably fixed to each side of the square. The bars 16 are secured to the square by cap screws 18 which extend through one of the bars and through the holes 14 of the square, and are then threadably engaged in the other bars. Holes 14 are made sufficiently large to permit screws 18 to pass freely therethrough. In this manner the rear bars 16 are located accurately in place before the screws are tightened. More specifically, the bars are located so as to provide proper spacing between the granite surface 12 and the front bars 20 to thereby create the proper magnetic force, as will appear. The bars 16 are locked permanently in place, that is, they require no additional adjustment.

The front bars 17 have an adjustable cam connection with their corresponding rear bar 16, to provide lateral or sideways adjustment and thereby insure squareness of the steel bars 16 to the reference surface RS in a lateral direction. In this manner the surface 12 of the granite need not be parallel in a lateral direction to the surface of the work being measured, as will appear. Bars 16 and 17 abut against one another and therefore bar 17 is properly positioned in a front and rear direction by the position of bars 16, as above mentioned. The cam connection, to be described, between bars 16 and 17 then permits adjustment of bars 16 in a lateral direction relative to bars 17 and the square.

The cam connection includes eccentrics 24 (FIGURE 3) in the bores 26 located along the length of the front bar 17. The eccentricity of the eccentrics can be varied by rotating them by means of a screw driver or the like (not shown) insertable in slots 24a in the cam. This rotation shift bars 17 to an adjusted position before locking them in place by tightening the cap screws 25 which are threadably engaged in bars 16. A magnet holder 20, formed of aluminum, is slidable (FIGURE 3) along and on the outside surface 17a of the front bars by stops 27 and 28. Stops 27 are biased against the bars 17 by springs 29 while stops 28 are fixed, positive stops. The spring loaded stops insure proper alignment of the holder on the bars 17 but permit easy sliding adjustment of the holder.

The U-shaped holder 20 has a permanent magnet 30 fixed therein by set screws 30a, which magnet includes opposite pole surfaces 31 and 32 (FIGURE 4). Strips of Teflon 33 may be secured along surfaces 31 and 32, as indicated, to reduce friction and these strips do not affect the magnetism. Thus, a magnetic field of force indicated by the dotted lines in FIGURE 5, acts to hold the holder against the surface 12 of the granite square. An air gap (FIGURE 3) of about .030 inch is maintained between the magnet and the metal bars, because bars 17 are set slightly to the rear of surface 12, as adjusted by the setting of bars 16.

The holder may have a series of tapped holes 34 along its length in which are secured various types of indicators I. These indicators may be of the electronic, dial, dial test or other types and can be detachably secured to the holder by their threaded mounting rods 35, or the like.

The point or feeler 36 of the indicator moves along the surface S of the workpiece to be measured and a direct reading is made on the indicator.

The granite square is in effect the matter from which the measurement is made and the indicator moves normal to the reference surface RS. Thus the workpiece surface S need not be positioned in parallelism, when viewed in plan, to the surface 12 of the gauge in order to be able to measure surface S for squareness and straightness along its length.

The indicator mounting is easily slid along the front side of the square without the necessity of any adjustments or forcing of the parts and accurate repeatability of readings is possible with a minimum of effort or skill on the part of the operator. While the magnetic field acts to hold the holder firmly against the granite square and resists pulling the holder in a direction away from the square, nevertheless the field does not prevent easy sliding movement of the holder across the field, that is, along the surface 12 of the granite square.

Various modes of carrying out the invention are contemplated as being within the scope of the following claims particularly pointing out and distinctly claiming the subject matter which is regarded as the invention.

I claim:

1. A gauge for measuring squareness and straightness of a workpiece surface comprising, a granite square having a precisely finished undersurface adapted to set on and cooperate with a precise reference surface and also having a precisely finished front surface arranged at a right angle to said undersurface for extending in a normal direction away from said reference surface, magnetically attractable guide means mounted on said square and extending along said front surface of said square and positioned normal to said reference surface, an indicator holder slidable along said guide means, and a magnet carried by said holder and providing a magnetic force field through said guide means which holds the holder against the front surface of said granite square for sliding therealong.

2. A gauge as defined in claim 1 further characterized in that said guide means includes a front surface extending along the front surface of said granite square, and an air gap is provided between the front surface of said guide means and said holder.

3. A gauge as defined in claim 1 further characterized in that said guide means are located on opposite sides of said granite front surface, said guide means each have a lateral surface, and said gauge also including resilient means for firmly mounting said holder against said lateral surfaces of said guide means for sliding movement of said holder along said lateral surfaces.

4. A gauge as defined in claim 1 further characterized in that said guide means includes adjustable means for positioning said guide means normal to said reference surface when said gauge is positioned on said reference surface.

5. A gauge as defined in claim 2 further characterized in that said guide means are located on opposite sides of said granite front surface, said guide means each have a lateral surface, and said gauge also including resilient means for firmly mounting said holder against said lateral surfaces of said guide means for sliding movement of said holder along said lateral surfaces.

6. A gauge as defined in claim 2 further characterized in that said guide means includes adjustable means for positioning said guide means normal to said reference surface when said gauge is positioned on said reference surface.

7. A gauge as defined in claim 3 further characterized in that said guide means includes adjustable means for positioning said guide means normal to said reference surface when said gauge is positioned on said reference surface.

8. A gauge as set forth in claim 1 further characterized in that said guide means includes a front bar and a rear bar secured on each of opposite sides of said granite front surface, said rear bars being adjustably secured to said granite square for adjustment in a front and rear direction toward and away from said granite square front surface, and said front bars being adjustably secured to said rear bars for adjustment in a lateral direction, whereby said holder moves in a direction normal to said reference surface.

9. A gauge as defined in claim 8 further characterized in that said front bars each have a front surface extending adjacent said front surface of said granite square, and an air gap is provided between the front surface of said bars and said holder.

10. A gauge as set out in claim 9 further characterized in that said front bars each have a lateral surface, and resilient means for firmly but slidably mounting said holder against said lateral surfaces.

References Cited

UNITED STATES PATENTS

| 1,345,597 | 7/1920 | Jantsch et al. | 33—174 |
| 2,410,877 | 11/1946 | Hall | 33—174 |

FOREIGN PATENTS

| 1,046,962 | 7/1953 | France. |
| 603,608 | 10/1934 | Germany. |
| 575,073 | 3/1958 | Italy. |

SAMUEL S. MATTHEWS, *Primary Examiner.*